(12) United States Patent
Liu et al.

(10) Patent No.: US 9,645,442 B2
(45) Date of Patent: May 9, 2017

(54) BACKLIGHT MODULE AND LIQUID CRYSTAL DISPLAY

(71) Applicants: BOE TECHNOLOGY GROUP CO., LTD., Beijing (CN); Xiamen BOE Electronics Co., Ltd., Xiamen (CN)

(72) Inventors: Shuangfei Liu, Beijing (CN); Jian Zhong, Beijing (CN)

(73) Assignees: BOE Technology Group Co., Ltd., Beijing (CN); Xiamen BOE Electronics Co., Ltd., Xiamen (CN)

( * ) Notice: Subject to any disclaimer, the term of this patent is extended or adjusted under 35 U.S.C. 154(b) by 335 days.

(21) Appl. No.: 14/141,397

(22) Filed: Dec. 26, 2013

(65) Prior Publication Data
US 2014/0184985 A1    Jul. 3, 2014

(30) Foreign Application Priority Data
Dec. 27, 2012    (CN) .......................... 2012 1 0581109

(51) Int. Cl.
*G02F 1/1333*    (2006.01)
*G02F 1/1335*    (2006.01)

(52) U.S. Cl.
CPC .. *G02F 1/133602* (2013.01); *G02F 1/133308* (2013.01); *G02F 1/133606* (2013.01);
(Continued)

(58) Field of Classification Search
CPC ......... G02F 1/133308; G02F 1/133608; G02F 1/133606; G02F 2001/133322;
(Continued)

(56) References Cited

U.S. PATENT DOCUMENTS 8,477,257 B2 * 7/2013 Nakano ............. G02F 1/133308
349/58
2004/0207773 A1    10/2004 Kao
(Continued)

FOREIGN PATENT DOCUMENTS

CN    101149509 A    3/2008
CN    101546057 A    9/2009
(Continued)

OTHER PUBLICATIONS

European Patent Office Communication enclosing Extended European Search Report for corresponding European Patent Application No. 13198290.2, 13 pages, (Aug. 1, 2014).
(Continued)

*Primary Examiner* — Nathanael R Briggs
*Assistant Examiner* — William Peterson
(74) *Attorney, Agent, or Firm* — Blakely, Sokoloff, Taylor & Zafman LLP

(57) ABSTRACT

The present invention belongs to a field of liquid crystal display technical, and relates to a backlight module and a liquid crystal display. The backlight module includes a backplane and a light source arranged on the backplane, and further includes a position-limiting unit. The position-limiting unit is arranged on the backplane, and is capable of limiting a liquid crystal panel at a set position. The backlight module according to the present invention is a direct-type backlight module. The advantageous effects of the present invention are as follows: as compared with a direct-type backlight module in the prior art in which a plastic frame is used to fix positions of respective components, the backlight module according to the present invention reduces the cost of the backlight module effectively and enables assembling of the backlight module to be easy due to employing a configuration without a plastic frame.

16 Claims, 3 Drawing Sheets

(52) U.S. Cl.
CPC ............... *G02F 1/133608* (2013.01); *G02F 2001/133314* (2013.01); *G02F 2001/133322* (2013.01); *G02F 2201/46* (2013.01)

(58) Field of Classification Search
CPC ... G02F 1/133602; G02F 2001/133314; G02F 2201/46
USPC ........................................................ 349/58, 64
See application file for complete search history.

(56) References Cited

U.S. PATENT DOCUMENTS

| | | | |
|---|---|---|---|
| 2006/0203479 A1* | 9/2006 | Lai ................... | G02F 1/133608 362/217.08 |
| 2009/0207334 A1* | 8/2009 | Kim .................. | G02F 1/133606 349/58 |
| 2011/0141391 A1 | 6/2011 | Kim et al. | |
| 2012/0020054 A1* | 1/2012 | Shan ................ | G02F 1/133608 362/97.1 |
| 2012/0081351 A1 | 4/2012 | Yokota | |
| 2012/0188479 A1 | 7/2012 | Han | |

FOREIGN PATENT DOCUMENTS

| | | |
|---|---|---|
| CN | 101639183 A | 2/2010 |
| CN | 102096218 A | 6/2011 |
| EP | 2 538 268 A1 | 12/2012 |

OTHER PUBLICATIONS

European Patent Office Communication enclosing Partial European Search Report for corresponding European Patent Application No. 13198290.2, 6 pages, (Mar. 21, 2014).

First Office Action for corresponding Chinese Patent Application No. 201210581109.X, 17 pages (including English translation), (Jun. 16, 2014).

Second Office Action for corresponding Chinese Patent Application No. 201210581109.X, 5 pages, (Nov. 13, 2014).

* cited by examiner

BACKLIGHT MODULE AND LIQUID CRYSTAL DISPLAY

FIELD OF THE INVENTION

The present invention belongs to a field of liquid crystal display technology, and relates to a backlight module and a liquid crystal display.

BACKGROUND OF THE INVENTION

A liquid crystal molecule cannot emit light by itself. Thus, a backlight module is employed in a liquid crystal display to provide a liquid crystal panel with a uniform and high-brightness light source. Generally, backlight modules may be categorized into side-edge backlight modules and direct-type backlight modules according to the distribution positions of light sources in the backlight modules. A light source in the side-edge backlight module is positioned at a side of a display panel, and the side-edge backlight module is usually used in a liquid crystal display of relatively small size. A light source in the direct-type backlight module is positioned at the bottom of a display panel, and the direct-type backlight module is usually used in a liquid crystal display of relatively large size.

An existing direct-type backlight module generally includes a backplane, a reflector and a light source which are arranged on the backplane, a diffuser arranged on the reflector, and a plastic frame which is arranged at the peripheries of the above components and is used for fixing the above components and a liquid crystal panel together. As compared with a side-edge backlight module, a direct-type backlight module has advantages of high light efficiency, no need of light guide plate, simple structure, and the like.

In the prior art, a light source includes a cold cathode fluorescent lamp (CCFL) and a light emitting diode (LED), and a through hole which corresponds to the position of the light-emitting body in a light source and enables the light-emitting body to pass through is previously provided on a reflector. When a direct-type backlight module and a liquid crystal panel are assembled, usually a light source is arranged on a backplane first, and then a reflector is arranged on the reflector. A through hole is provided on the reflector, and the light-emitting body in the light source passes through the through hole. A diffuser is arranged above the reflector. Then, the above components are assembled in a plastic frame to make the above components have fixed positions. Next, the liquid crystal panel is arranged above the plastic frame, and the backlight module and the liquid crystal panel are assembled together through the plastic frame. Finally, all of the above components are arranged into a casing.

In a backlight module, a plastic frame is used for ensuring the overall strength and the integrity of the backlight module, and is used for supporting a liquid crystal panel. From the aspect of structure, a plastic frame includes a one-piece plastic frame and a four-piece plastic frame (each piece thereof corresponds to one side of the liquid crystal panel). In the prior art, a mold for plastic frame is previously prepared, and then a plastic frame is formed by using polycarbonate (PC) material and by using the mold for plastic frame. The cost for manufacturing the mold for plastic frame and the cost of plastic frame material account for a large part of the cost of the backlight module. Especially in a backlight module of large size, the cost of a plastic frame makes the cost of a backlight module high.

SUMMARY OF THE INVENTION

In view of the above defects existing in a backlight module in the prior art, the technical problem to be solved by the present invention is to provide a backlight module and a liquid crystal display. The backlight module is a direct-type backlight module, and is of lower cost and enables assembling of the backlight module to be easier than the backlight module in the prior art.

A solution employed to solve the technical problem of the present invention is to provide a backlight module. The backlight module includes a backplane and a light source arranged on the backplane, and further includes a position-limiting unit. The position-limiting unit is arranged on the backplane and used for limiting a liquid crystal panel arranged on the backlight module at a set position.

Preferably, the backplane includes a first base plate and a first bulge surrounding the periphery of the first base plate, the liquid crystal panel is supported on the first bulge, the position-limiting unit includes a plurality of position-limiting blocks which are distributed on the first bulge, and the plurality of position-limiting blocks are in contact with respective sides of the liquid crystal panel respectively to limit the liquid crystal panel within an area surrounded by the plurality of position-limiting blocks.

Furthermore, an upper surface of each of the plurality of position-limiting blocks is higher than an upper surface of the liquid crystal panel on the first bulge.

Preferably, each of the plurality of position-limiting blocks is arranged at each side of the liquid crystal panel and is in contact with the side respectively; or every two of the plurality of position-limiting blocks are arranged at each side of the liquid crystal panel and are in contact with the side respectively.

The backlight module further includes a reflector and a diffuser, the reflector includes a second base plate and a second bulge surrounding the periphery of the second base plate, the second bulge is arranged on the first bulge, the diffuser is supported on the second bulge, the liquid crystal panel is arranged on the diffuser, the second bulge of the reflector and the diffuser are provided with position-limiting notches at positions corresponding to the plurality of position-limiting blocks.

Preferably, the backlight module further includes an isolation unit which is used for maintaining a set distance between the backlight module and the liquid crystal panel.

A preferred solution is that, the isolation unit includes a plurality of isolation blocks, the plurality of isolation blocks are arranged between the diffuser and the liquid crystal panel and are located at the periphery of the diffuser; a part of the diffuser which corresponds to each side of the liquid crystal panel is provided with one isolation block, a length of each isolation block of the plurality of isolation blocks is less than or equal to a length of a side of the liquid crystal panel which corresponds to the isolation block; or, a part of the diffuser which corresponds to each side of the liquid crystal panel is provided with two or more isolation blocks, for two or more isolation blocks which correspond to the same side of the liquid crystal panel, a sum of the lengths of the two or more isolation blocks is less than or equal to a length of a side of the liquid crystal panel which corresponds to the two or more isolation blocks.

Preferably, the diffuser is provided with a plurality of positioning notches at edges thereof, ant the plurality of isolation blocks are arranged to locate within areas defined by the plurality of positioning notches, respectively.

A preferred solution is that, the isolation unit includes a plurality of isolation blocks, the plurality of isolation blocks are arranged between the first bulge of the backplane and the liquid crystal panel; a part of the first bulge which corresponds to each side of the liquid crystal panel is provided with one isolation block, a length of the one isolation block is less than or equal to a length of a side of the liquid crystal panel which corresponds to the one isolation block; or, a part of the first bulge which corresponds to each side of the liquid crystal panel is provided with two or more isolation blocks, a sum of the lengths of the two or more isolation blocks is less than or equal to a length of a side of the liquid crystal panel which corresponds to the two or more isolation blocks.

Preferably, the second bulge of the reflector and edges of the diffuser are respectively provided with isolation notches at positions which correspond to the isolation blocks arranged on the first bulge, and the isolation blocks are arranged within the isolation notches so that the isolation blocks are capable of maintaining a set distance between the backlight module and the liquid crystal panel.

The isolation blocks are formed of polyethylene terephthalate, and the isolation blocks are bonded on the first bulge of the backplane (in the case that the isolation blocks are arranged between the first bulge of the backplane and the liquid crystal panel) or on the diffuser (in the case that the isolation blocks are arranged between the diffuser and the liquid crystal panel); the position-limiting blocks are formed of polyethylene terephthalate, and the position-limiting blocks are bonded on the first bulge of the backplane; the backplane is formed of electro-galvanized steel, and the first bulge of the backplane is provided with a stiffener.

A liquid crystal display including a liquid crystal panel, the liquid crystal display further includes the backlight module as described above, and the backlight module is arranged below the liquid crystal panel.

Preferably, the liquid crystal display further includes a casing used for fixing the backlight module and the liquid crystal panel, the casing is formed of electro-galvanized steel, a part of the casing which corresponds to the first bulge of the backplane is provided with a stiffener.

The backlight module according to the present invention is a direct-type backlight module. As compared with an assembling manner employed in a direct-type backlight module in the prior art in which a plastic frame is used to fix respective components, the backlight module according to the present invention does not need a plastic frame because the direct-type backlight module according to the present invention includes a position-limiting unit used for limiting the liquid crystal panel at a set position, an isolation unit used for maintaining a set distance between the backlight module and the liquid crystal panel, and a bonding material used for bonding respective components together. That is, the direct-type backlight module according to the present invention employs a configuration without a plastic frame, which reduces the cost of the backlight module effectively and enables assembling of the backlight module to be easier.

BRIEF DESCRIPTION OF THE DRAWINGS

In order to clearly illustrate the technical solutions of the embodiments of the invention, the drawings of the embodiments will be briefly described in the following. Apparently, the described drawings are only directed to some embodiments of the invention and thus are not limitative to the present invention.

DETAILED DESCRIPTION OF THE EMBODIMENTS

For better understanding the technical solutions of the present invention by a person skilled in the art, a backlight module and a liquid crystal display according to the present invention will be described in detail with reference to the drawings and the following embodiments.

A backlight module includes a backplane and a light source arranged on the backplane. The backlight module further includes a position-limiting unit, and the position-limiting unit is arranged on the backplane and used for limiting a liquid crystal panel arranged on the backlight module at a set position.

A liquid crystal display includes a liquid crystal panel. The liquid crystal display further includes the backlight module as described above, and the backlight module is arranged below the liquid crystal panel.

Embodiment 1

Figure 1:
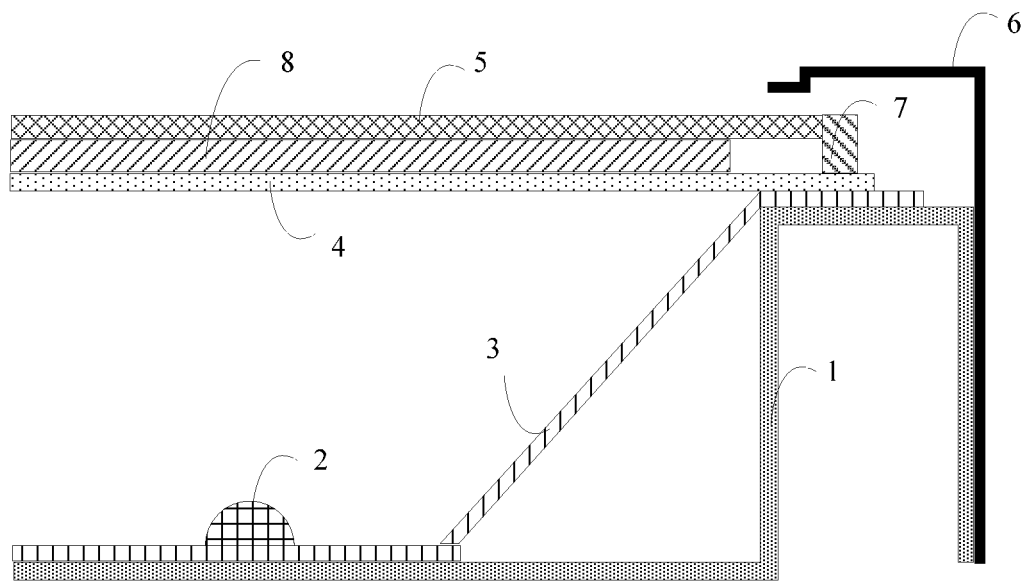
FIG. 1 is a longitudinal sectional view of a part of the assembly of a backlight module and a liquid crystal panel according to embodiment 1 of the present invention.
Figure 2:
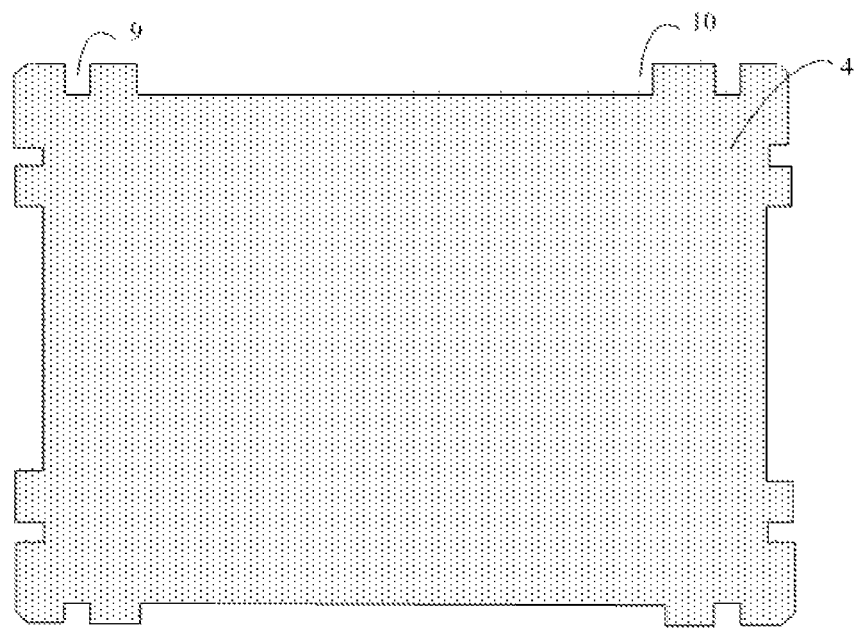
FIG. 2 is a top view of a diffuser according to embodiment 1 of the present invention.
Figure 3:
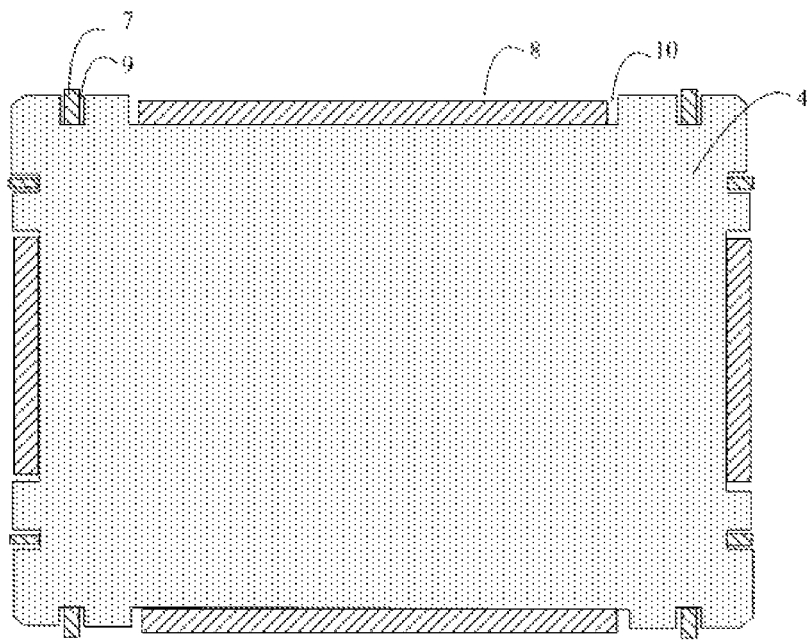
FIG. 3 is a top view of a part of a backlight module according to embodiment 1 of the present invention.

As shown in FIGS. 1 to 3, a backlight module includes a backplane 1 and a light source 2 arranged on the backplane 1. A position-limiting unit is provided on the backplane 1, and the position-limiting unit is capable of limiting a liquid crystal panel 5 at a set position. An isolation unit is further provided on the backplane 1, and the isolation unit is capable of maintaining a set distance between the backlight module and the liquid crystal panel 5.

The backplane includes a first base plate and a first bulge surrounding the periphery of the first base plate. The liquid crystal panel is supported on the first bulge. The position-limiting unit includes a plurality of position-limiting blocks distributed on the first bulge which are in contact with respective sides of the liquid crystal panel respectively to limit the liquid crystal panel within an area surrounded by the plurality of position-limiting blocks. As shown in FIG. 1, the backplane 1 includes a first rectangular bottom (i.e., the first base plate), a first side extending vertically and upwards from each edge of the first bottom, and a first eave (i.e., the first bulge) extending horizontally and outwards from the upper edge of the first side.

In the present embodiment, the position-limiting unit includes two position-limiting blocks 7 which are arranged on the first eave corresponding to each edge of the first bottom of the backplane 1, respectively. That is, two position-limiting blocks 7 are arranged at each side of the liquid crystal panel, and the two position-limiting blocks are in contact with the corresponding side. The two position-limiting blocks are located at positions which are close to an edge of the corresponding side of the liquid crystal panel, respectively.

An upper surface of each of the plurality of position-limiting blocks is higher than an upper surface of the liquid crystal panel on the first bulge, and a height of each position-limiting block is preferably larger than or equal to a sum of a set distance between the backlight module and the liquid crystal panel and a thickness of the liquid crystal panel, such that it is ensured that the position-limiting blocks 7 are capable of limiting the position of the liquid crystal panel 5 and fixing the liquid crystal panel 5 effectively to prevent a fragmentation failure occurring when the liquid crystal panel is shocked by an external force.

Preferably, the position-limiting blocks 7 are formed of cushioning material commonly used in the art, and are usually formed of polyethylene terephthalate (PET). PET is crystalline thermoplastic plastic, has an obvious melting point of 245-260° C., and has advantages of good dimensional stability, heat resistance, electrical insulation, and low price. In the present embodiment, the position-limiting blocks 7 are bonded on the first eave of the backplane 1 through bonding material such as double-sided adhesive, respectively.

In the backlight module, the isolation unit includes a plurality of isolation blocks, and the plurality of isolation blocks may be arranged between the first bulge (i.e., the first eave) of the backplane and the liquid crystal panel. Specifically, a part of the first eave which corresponds to each side of the liquid crystal panel is provided with one isolation block 8, and a length of the isolation block 8 is less than or equal to a length of a side of the liquid crystal panel which corresponds to the isolation block 8.

Preferably, a height of each of the isolation blocks 8 is equal to a set distance between the backlight module and the liquid crystal panel. A length and a shape of the isolation block 8 may be set according to practical design requirements such as the size of a liquid crystal panel cooperating with the isolation block 8, strength of an external force the liquid crystal panel needs to withstand in an operating environment, and the like, and are not defined herein.

The isolation blocks 8 are formed of the same material as that of the position-limiting blocks 7, i.e., are formed of polyethylene terephthalate. The isolation blocks 8 are bonded on the first eave of the backplane 1 through bonding material such as double-sided adhesive, respectively.

In the present embodiment, a light source 2 in the backlight module may be a cold cathode fluorescent lamp (CCFL) or a light emitting diode (LED). In order to ensure that the utilization ratio of the light source 2 in the backlight module is high, the backlight module further includes a reflector 3. The reflector 3 includes a second base plate (i.e., a second bottom) and a second bulge (i.e., a second eave) surrounding the periphery of the second base plate, and the second bulge is arranged on the first bulge. Specifically, the reflector 3 includes a second rectangular bottom, a second side extending obliquely and upwards from each edge of the second bottom, and a second eave (i.e., the second bulge) extending horizontally and outwards from the upper edge of the second side. The second bottom is smaller than the first bottom, and the second eave and the first eave at least partially overlap each other. The second eave are provided with position-limiting notches at positions which correspond to the plurality of position-limiting blocks 7 respectively, and the second eave are provided with isolation notches at positions which correspond to the plurality of isolation blocks 8 respectively.

A through hole, which corresponds to the position of the light-emitting body in the light source 2 and enables the light-emitting body to pass through, is previously provided on the second bottom of the reflector 3. The through hole in the reflector 3 which enables the light-emitting body to pass through may be adaptively modified according to different forms of the light source 2 in the backlight module.

In order to ensure that light emitted from the backlight module has better uniformity, the backlight module further includes a diffuser 4. The diffuser 4 is supported on the second bulge of the reflector 3, and the liquid crystal panel is arranged on the diffuser 4. Specifically, the diffuser 4 is rectangular, and the edge of the diffuser 4 and the second eave of the reflector 3 at least partially overlap each other. As shown in FIG. 2, the diffuser 4 is provided with position-limiting notches 9 at positions which correspond to the plurality of position-limiting blocks 7 respectively, and the diffuser 4 is provided with isolation notches 10 at positions which correspond to the plurality of isolation blocks 8 respectively.

In order to simplify a process flow of the backlight module in a manufacturing procedure, the shapes and the sizes of the position-limiting notches and the shapes and the sizes of the isolation notches on the reflector 3 and on the diffuser 4 may be the same, and all of them may be set according to practical requirements. By arranging the position-limiting notches on the reflector 3 and on the diffuser 4, positions enabling the position-limiting blocks 7 to pass through are reserved for the position-limiting blocks 7, such that the position-limiting blocks 7 can maintain the liquid crystal panel at a set position which is fixed after the backlight module and the liquid crystal panel being assembled. By arranging the isolation notches on the reflector 3 and on the diffuser 4, positions enabling the isolation blocks 8 to pass through are reserved for the isolation blocks 8, such that the isolation blocks 8 can isolate the backlight module from the liquid crystal panel completely and maintain a set distance between the backlight module and the liquid crystal panel after the backlight module and the liquid crystal panel being assembled. Thus, it is ensured that the backlight module can provide the liquid crystal panel with required light, and it facilitates ensuring that positions of respective components of the backlight module when assembled are correct.

A liquid crystal display includes a liquid crystal panel 5 and the backlight module as described above. The backlight module is arranged below the liquid crystal panel 5. That is, the above backlight module is a direct-type backlight module. As shown in FIG. 1, in the longitudinal sectional view of a part of the assembly of the backlight module and the liquid crystal panel, the liquid crystal display further includes a casing 6 which is used for fixing the backlight module and the liquid crystal panel 5. The backplane 1 and the casing 6 are fixed, which makes the backlight module and the liquid crystal panel 5 be packaged as a whole.

As compared with an existing backlight module, the backlight module according to the present embodiment does not need a plastic frame to fix positions of respective components of the backlight module and to support the liquid crystal panel 5. The backlight module according to the present embodiment only employs the position-limiting blocks and the isolation blocks which are designed to be located at local areas to maintain positions of respective components of the backlight module and a position of the liquid crystal panel and to maintain a certain distance between the backlight module and the liquid crystal panel.

Preferably, in order to further improve the strength of the liquid crystal display, the backplane 1 is formed of electro-galvanized steel (SECC), and the first bulge of the backplane 1 is provided with a plurality of stiffeners. Also, the casing 6 is formed of electro-galvanized steel, and an area of the casing 6 which corresponds to the first eave of the backplane is provided with a plurality of stiffeners.

In a procedure for manufacturing the liquid crystal display, before the backlight module is assembled, the second eave of the reflector 3 is provided with double-sided adhesive having viscidity at both the front side and the back side thereof, and both the position-limiting blocks 7 and the isolation blocks 8 are bonded at predetermined positions on the first eave of the backplane 1 previously. When the backlight module is assembled, the light source 2 is arranged at a predetermined position on the backplane 1 first. Next, the reflector 3 is arranged on the backplane 1 such that the light-emitting body of the light source 2 passes through the through hole on the reflector 3 to be exposed from the front side of the reflector. The isolation notches and the position-limiting notches arranged on the second eave of the reflector 3 are aligned with the isolation blocks 8 and the position-limiting blocks 7 respectively. The reflector 3 is bonded onto the front side of the first eave of the backplane 1 through the double-sided adhesive provided on the back side of the second eave of the reflector 3. Then, the isolation notches 10 and the position-limiting notches 9 at the edge of the diffuser 4 are aligned with the isolation blocks 8 and the position-limiting blocks 7 respectively. The diffuser 4 is bonded onto a corresponding position on the reflector 3 through the double-sided adhesives provided on the front side of the second eave of the reflector, such that the backlight module is formed. Finally, the backlight module and the liquid crystal panel 5 are combined together, the casing 6 is assembled, and the backplane 1 and the casing 6 are fixed by using a bolt and a nut or other fasteners to maintain the overall strength of the liquid crystal panel 5 and the backlight module.

Embodiment 2

The present embodiment differs from embodiment 1 in the number as well as arrangement positions of the isolation blocks included in the isolation unit.

Figure 4:
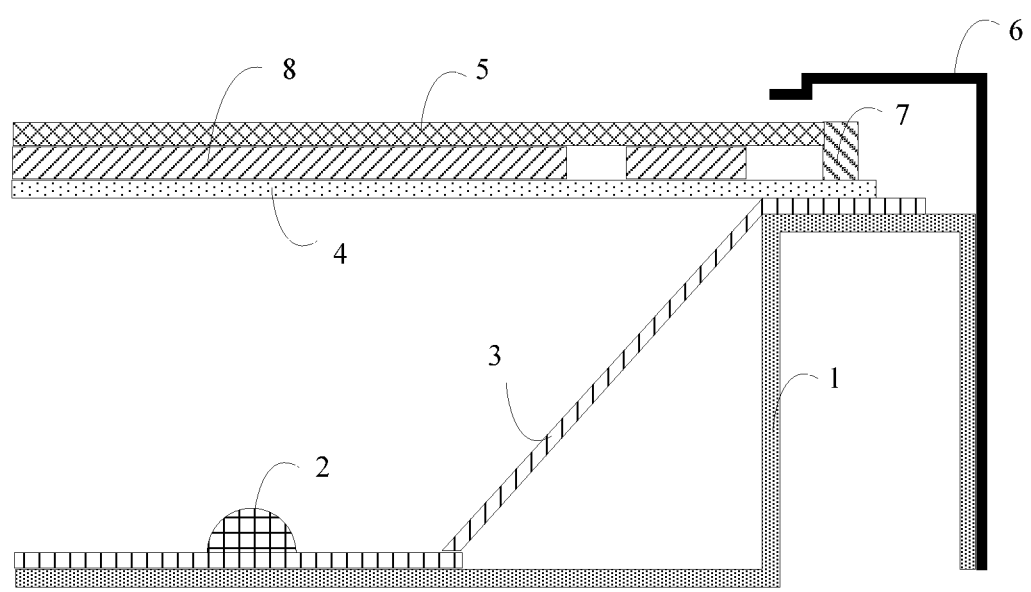
FIG. 4 is a longitudinal sectional view of a part of the assembly of a backlight module and a liquid crystal panel according to embodiment 2 of the present invention.

As shown in FIG. 4, in the present embodiment, the first eave of the backplane 1 is provided with two or more isolation blocks at positions corresponding to each side of the liquid crystal panel, and a sum of the lengths of the two or more isolation blocks is less than or equal to a length of a side of the liquid crystal panel which corresponds to the two or more isolation blocks.

Correspondingly, the second bulge of the reflector and the edge of the diffuser are respectively provided with isolation notches at positions corresponding to the positions on the first bulge at which the isolation blocks are arranged. The isolation blocks are arranged in the isolation notches, such that the isolation blocks can maintain a set distance between the backlight module and the liquid crystal panel.

Other configurations of the backlight module according to the present embodiment are the same as those according to embodiment 1, thus description thereof is omitted.

Embodiment 3

The present embodiment differs from embodiment 1 in arrangement positions of the isolation blocks included in the isolation unit.

In the present embodiment, the isolation unit includes a plurality of isolation blocks, the plurality of isolation blocks are arranged between the diffuser and the liquid crystal panel and are located at the periphery of the diffuser; the diffuser is provided with one isolation block at a position corresponding to each side of the liquid crystal panel. The isolation block is located between a pair of position-limiting blocks on the first eave which correspond to the one isolation block. A length of each isolation block of the plurality of isolation blocks is less than or equal to a length of a side of the liquid crystal panel which corresponds to the isolation block.

Figure 5:
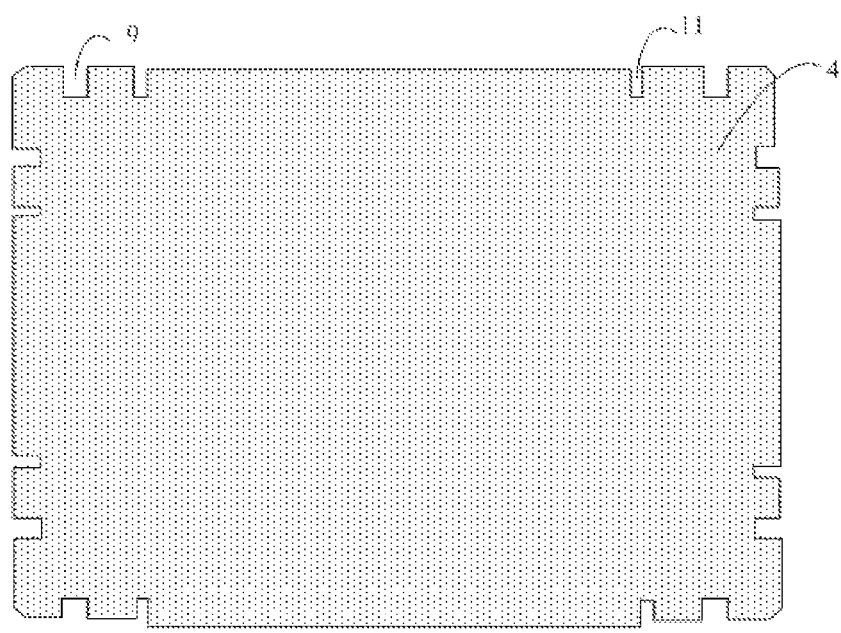
FIG. 5 is a top view of a diffuser according to embodiment 3 of the present invention.

In order to ensure the accuracy of positions on the diffuser at which the isolation blocks are assembled, as shown in FIG. 5, the diffuser is provided with a plurality of positioning notches 11 at the edge thereof, and the isolation blocks are respectively arranged to locate within areas defined by the plurality of positioning notches 11. That is, one positioning notch is provided on the diffuser at a position corresponding to each of the two sides of each isolation block. The arrangement of the positioning notches is equivalent to providing a foolproof design on the diffuser 4, facilitating correct bonding between the isolation blocks and the diffuser. Thus, the correctness of assembling respective components of the backlight module is ensured.

Other configurations of the backlight module according to the present embodiment are the same as those according to embodiment 1, thus description thereof is omitted.

Embodiment 4

The present embodiment differs from embodiment 3 in the number and arrangement positions of the isolation blocks included in the isolation unit.

In the present embodiment, the diffuser is provided with two or more isolation blocks at a position corresponding to each side of the liquid crystal panel, for two or more isolation blocks which correspond to the same side of the liquid crystal panel, a sum of the lengths of the two or more isolation blocks is less than or equal to a length of a side of the liquid crystal panel which corresponds to the two or more isolation blocks.

Correspondingly, the number and the arrangement positions of the positioning notches provided at the edge of the diffuser match to the number and the arrangement positions of the isolation blocks.

Other configurations of the backlight module according to the present embodiment are the same as those according to embodiment 1, thus description thereof is omitted.

Embodiment 5

The present embodiment differs from embodiments 1 to 4 in the number of the position-limiting blocks included in the position-limiting unit.

In the present embodiment, the plurality of position-limiting blocks included in the position-limiting unit are arranged at sides of the liquid crystal panel and are in contact with the sides respectively, i.e., only one position-limiting block is arranged at each side of the liquid crystal panel.

Other configurations of the backlight module according to the present embodiment are the same as those according to embodiment 1, thus description thereof is omitted.

In consideration of a subsequent reliability test, as compared with embodiments 1 to 4, the arrangement manner of the position-limiting unit according to the present embodiment is suitable for a liquid crystal panel of relatively small size.

As compared with an existing direct-type backlight module, the backlight modules according to embodiments 1 to 5 employ a configuration without a plastic frame, making respective components of the backlight module be supported on the first bulge (i.e., a weight bearing surface) of the backplane 1. The isolation blocks and the position-limiting blocks are arranged at the periphery of the backlight module to support the liquid crystal panel, to limit the position of the liquid crystal panel, and to fix the liquid crystal panel. This is realized merely by making minor changes to the structures of respective components of an existing direct-type backlight module. Furthermore, the respective components can be aligned with each other and bonded together merely by a predesigned cooperative-position relationship, thus, assembling is easier. Meanwhile, the respective components can be assembled to form a whole merely by commonly used double-sided adhesive. The cost of the double-sided adhesive, the isolation blocks, and the position-limiting blocks is smaller than the cost of an existing mold for plastic frame and material of a plastic frame. Thus, the cost of the backlight module may be reduced effectively. The present invention is especially suitable for a structural design of a backlight module cooperating with a liquid crystal panel of large size.

It should be understood that, the above embodiments are only exemplary embodiments for the purpose of explaining the principle of the present invention, and the present invention is not limited thereto. For a person having ordinary skill in the art, various improvements and modifications may be applied to the present invention without departing from the spirit and essence of the present invention. These improvements and modifications are also covered by the scope of the claims of the present invention.

What is claimed is:

1. A backlight module comprising:
a backplane; and
a light source arranged on the backplane, wherein the backlight module further includes a position-limiting unit, the position-limiting unit is arranged on the backplane and used for limiting a liquid crystal panel arranged on the backlight module at a set position, wherein the backplane includes a first base plate and a first bulge surrounding the periphery of the first base plate, the liquid crystal panel is supported on the first bulge, the position-limiting unit includes a plurality of position-limiting blocks which are distributed on the first bulge, and the plurality of position-limiting blocks are in contact with respective sides of the liquid crystal panel respectively to limit the liquid crystal panel within an area surrounded by the plurality of position-limiting blocks, and wherein the backlight module includes a reflector and a diffuser, the reflector includes a second base plate and a second bulge surrounding the periphery of the second base plate, the second bulge is arranged on the first bulge, the diffuser is supported on the second bulge, the second bulge is in contact with the first bulge and the diffuser, the liquid crystal panel is arranged on the diffuser, the second bulge of the reflector and the diffuser are provided with position-limiting notches at positions corresponding to the plurality of position-limiting blocks.

2. The backlight module according to claim 1, wherein an upper surface of each of the plurality of position-limiting blocks is higher than an upper surface of the liquid crystal panel on the first bulge.

3. The backlight module according to claim 2, wherein each of the plurality of position-limiting blocks is arranged at each side of the liquid crystal panel and is in contact with the side respectively; or every two of the plurality of position-limiting blocks are arranged at each side of the liquid crystal panel and are in contact with the side respectively.

4. The backlight module according to claim 1, wherein the backlight module further includes an isolation unit which is used for maintaining a set distance between the backlight module and the liquid crystal panel.

5. The backlight module according to claim 4, wherein the isolation unit includes a plurality of isolation blocks, the plurality of isolation blocks are arranged between the diffuser and the liquid crystal panel and are located at the periphery of the diffuser; wherein, a part of the diffuser which corresponds to each side of the liquid crystal panel is provided with one isolation block, a length of each isolation block of the plurality of isolation blocks is less than or equal to a length of a side of the liquid crystal panel which corresponds to the isolation block; or, a part of the diffuser which corresponds to each side of the liquid crystal panel is provided with two or more isolation blocks, for two or more isolation blocks which correspond to the same side of the liquid crystal panel, a sum of the lengths of the two or more isolation blocks is less than or equal to a length of a side of the liquid crystal panel which corresponds to the two or more isolation blocks.

6. The backlight module according to claim 5, wherein the diffuser is provided with a plurality of positioning notches at edges thereof, and the plurality of isolation blocks are arranged to locate within areas defined by the plurality of positioning notches, respectively.

7. The backlight module according to claim 4, wherein the isolation unit includes a plurality of isolation blocks, the plurality of isolation blocks are arranged between the first bulge of the backplane and the liquid crystal panel; wherein, a part of the first bulge which corresponds to each side of the liquid crystal panel is provided with one isolation block, a length of the one isolation block is less than or equal to a length of a side of the liquid crystal panel which corresponds to the one isolation block; or, a part of the first bulge which corresponds to each side of the liquid crystal panel is provided with two or more isolation blocks, a sum of the lengths of the two or more isolation blocks is less than or equal to a length of a side of the liquid crystal panel which corresponds to the two or more isolation blocks.

8. The backlight module according to claim 7, wherein the second bulge of the reflector and edges of the diffuser are respectively provided with isolation notches at positions which correspond to the isolation blocks arranged on the first bulge, and the isolation blocks are arranged within the isolation notches so that the isolation blocks are capable of maintaining a set distance between the backlight module and the liquid crystal panel.

9. The backlight module according to claim 5, wherein the isolation blocks are formed of polyethylene terephthalate, and the isolation blocks are bonded on the diffuser; the position-limiting blocks are formed of polyethylene terephthalate, and the position-limiting blocks are bonded on the first bulge of the backplane; the backplane is formed of electro-galvanized steel, and the first bulge of the backplane is provided with a stiffener.

10. The backlight module according to claim 6, wherein the isolation blocks are formed of polyethylene terephthalate, and the isolation blocks are bonded on the diffuser; the position-limiting blocks are formed of polyethylene terephthalate, and the position-limiting blocks are bonded on the first bulge of the backplane; the backplane is formed of electro-galvanized steel, and the first bulge of the backplane is provided with a stiffener.

11. The backlight module according to claim 7, wherein the isolation blocks are formed of polyethylene terephthalate, and the isolation blocks are bonded on the first bulge of the backplane; the position-limiting blocks are formed of polyethylene terephthalate, and the position-limiting blocks are bonded on the first bulge of the backplane; the backplane is formed of electro-galvanized steel, and the first bulge of the backplane is provided with a stiffener.

12. The backlight module according to claim 8, wherein the isolation blocks are formed of polyethylene terephthalate, and the isolation blocks are bonded on the first bulge of the backplane; the position-limiting blocks are formed of polyethylene terephthalate, and the position-limiting blocks are bonded on the first bulge of the backplane; the backplane is formed of electro-galvanized steel, and the first bulge of the backplane is provided with a stiffener.

13. A liquid crystal display comprising:
a liquid crystal panel, wherein the liquid crystal display further includes a backlight module arranged below the liquid crystal panel, the backlight module includes a backplane and a light source arranged on the backplane, wherein the backlight module further includes a position-limiting unit, the position-limiting unit is arranged on the backplane and used for limiting a liquid crystal panel arranged on the backlight module at a set position, wherein the backplane includes a first base plate and a first bulge surrounding the periphery of the first base plate, the liquid crystal panel is supported on the first bulge, the position-limiting unit includes a plurality of position-limiting blocks which are distributed on the first bulge, and the plurality of position-limiting blocks are in contact with respective sides of the liquid crystal panel respectively to limit the liquid crystal panel within an area surrounded by the plurality of position-limiting blocks, and wherein the backlight module includes a reflector and a diffuser, the reflector includes a second base plate and a second bulge surrounding the periphery of the second base plate, the second bulge is arranged on the first bulge, the diffuser is supported on the second bulge, the second bulge is in contact with the first bulge and the diffuser, the liquid crystal panel is arranged on the diffuser, the second bulge of the reflector and the diffuser are provided with position-limiting notches at positions corresponding to the plurality of position-limiting blocks.

14. The liquid crystal display according to 13, wherein an upper surface of each of the plurality of position-limiting blocks is higher than an upper surface of the liquid crystal panel on the first bulge.

15. The liquid crystal display according to claim 14, wherein each of the plurality of position-limiting blocks is arranged at each side of the liquid crystal panel and is in contact with the side respectively; or every two of the plurality of position-limiting blocks are arranged at each side of the liquid crystal panel and are in contact with the side respectively.

16. The liquid crystal display according to claim 13, wherein the liquid crystal display further includes a casing used for fixing the backlight module and the liquid crystal panel, the casing is formed of electro-galvanized steel, a part of the casing which corresponds to the first bulge of the backplane is provided with a stiffener.

* * * * *